H. O. HEM.
WEIGHING SCALE.
APPLICATION FILED JAN. 26, 1920.

1,411,213.

Patented Mar. 28, 1922.
2 SHEETS—SHEET 1.

Inventor
Halvor O. Hem.
By George R. Frye
Attorney

H. O. HEM.
WEIGHING SCALE.
APPLICATION FILED JAN. 26, 1920.
1,411,213.
Patented Mar. 28, 1922.
2 SHEETS—SHEET 2.
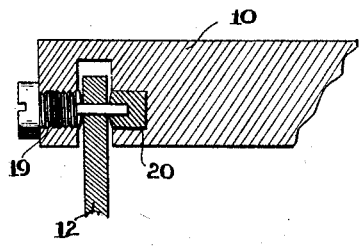
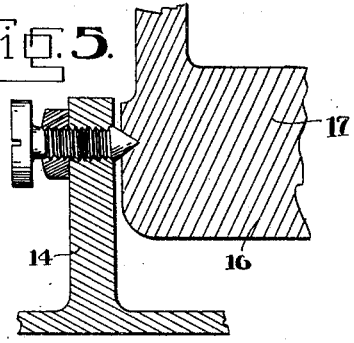
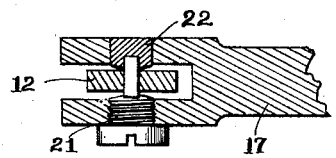
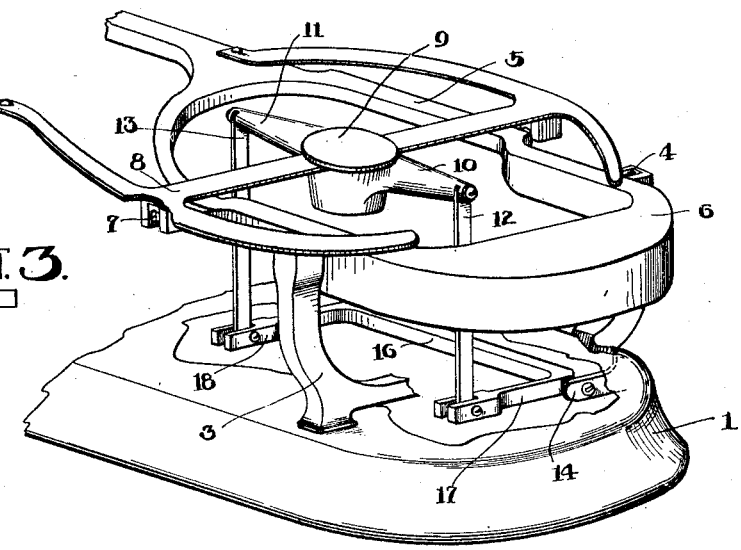
Inventor
Halvor O. Hem.
By George R. Frye
Attorney

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

1,411,213.   Specification of Letters Patent.   Patented Mar. 28, 1922.

Application filed January 26, 1920. Serial No. 354,142.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales and particularly to scales in which the platter or other commodity-receiver is supported upon a single lever. In scales of this type the platter ordinarily rests upon a spider which in turn is carried by a pair of aligned load pivots, and some means must therefore be provided to prevent the platter from toppling over. To this end the spider is usually provided with a projection which is pivoted to one end of a check link, the other end of the link being pivoted to the frame of the scale, the relation of the parts being such that lines joining the load and fulcrum pivots of the lever and the check link pivots form a parallelogram, two of the sides of which are substantially vertical. The distance between the check link pivots in this construction is very short, and any change in the relative lengths of the vertical sides of the parallelogram due to wearing of the lever pivots causes errors in weighing articles placed upon the front or rear portion of the platter.

This invention has for its object the provision of means for maintaining the platter in substantially horizontal position, which means is not affected by wearing of the lever pivots so as to cause errors in weighing.

Other objects and advantages will be apparent from the following description, in which reference is had to the accompanying drawings illustrating a preferred embodiment of my invention and in which similar reference numerals designate similar parts throughout the several views.

In the drawings:—

Figure 3 is a view in perspective of the parts shown in Figure 2;

Figure 4 is a vertical sectional view of a portion of an arm on the platter spider, showing the manner of connecting a depending link therewith;

Figure 5 is is a sectional plan showing the connection between the rocking member forming an element of my invention and the scale frame; and Figure 6 is a similar section showing a connection between an arm on the said rocking member and a link depending from the platter spider.

Figure 1:
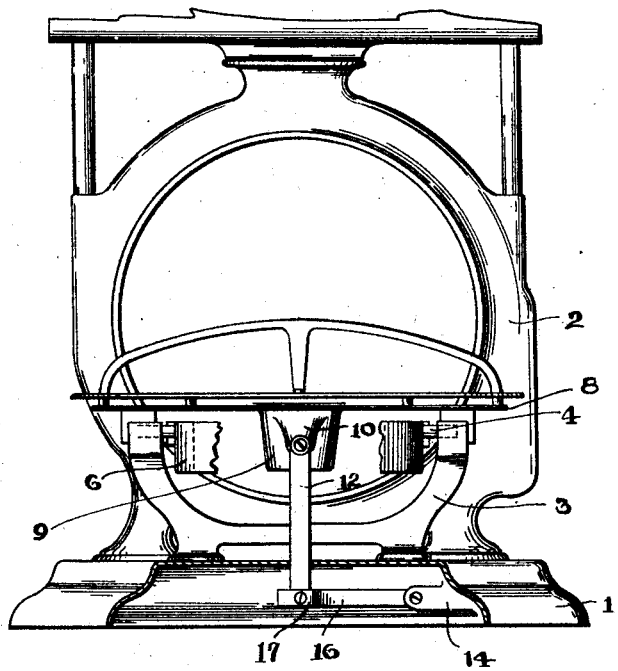
Figure 1 is a front elevation of a portion of a scale embodying my invention, parts of the scale being broken away to disclose essential elements thereof.
Figure 2:
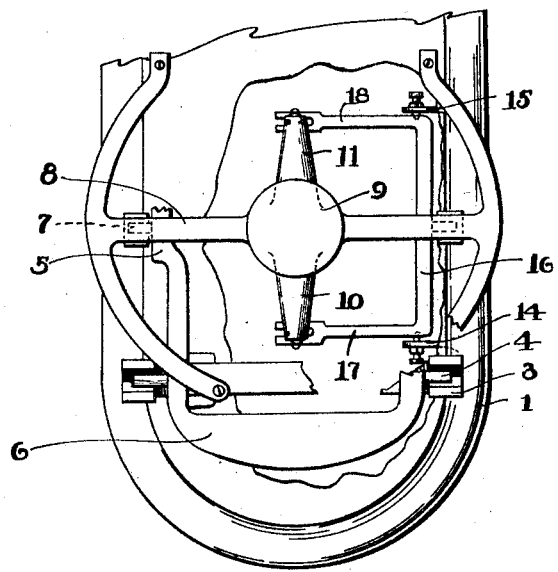
Figure 2 is a plan view of a portion of a scale embodying my invention, part of the base housing being broken away.

Referring to the drawings in detail, I have shown therein a portion of a scale, the frame of which comprises a base housing 1 upon the forward end of which is supported a casing 2 adapted to enclose the load-offsetting mechanism of the scale. Since the device of my invention is not limited in its application to scales having any particular form of load-offsetting mechanism I have not illustrated the load-offsetting mechanism and have shown only so much of the structure of the scale as is necessary for clear understanding of the invention. Mounted upon the forward portion of the base housing 1 is a base horn 3, in the upper ends of which are supported the fulcrum pivots 4 of the main lever 5 of the scale. The particular lever shown is provided at its forward end with a counterbalance 6 to neutralize the weight of the platter and other parts carried by the forward portion of the lever. It will be understood, however, that my invention is equally applicable to scales having levers which are not provided with counterbalances of this kind. The load pivots 7 of the lever 5 are located forwardly of the fulcrum pivots 4, and supported upon said load pivots is a platter spider 8 adapted to support the platter or other commodity-receiver of the scale in the usual manner and provided with the usual loading box 9. Extending forwardly and rearwardly from the loading box portion of the platter spider are arms 10 and 11, and pivoted respectively to the forward end of the arm 10 and the rear end of the arm 11 are depending links 12 and 13. Extending longitudinally of the scale and pivotally mounted on brackets 14 and 15 carried within the base housing thereof is a rocking member 16, and rigid with the said rocking member at each end thereof are arms 17 and 18 which extend laterally to points beneath th corresponding ends of the arms 10 and 11 where they are pivotally connected to the lower ends of the links 12 and 13.

Since the axis of the pivot on which the rocking member 16 is mounted extends longitudinally of the scale, the plane of movement of each of the arms 17 and 18 is at right angles to the plane of movement of the lever 5. In order to prevent binding at the connections between the links 12 and 13 and the arms 10 and 11 I have utilized the universal connection shown in Figure 4. It will be seen by inspection of this figure that the end of the arm 10 is tapped out and carries a screw 19 and a bushing 20, the screw 19 being formed with a pin-like extension which enters a depression in the bushing 20, and the contiguous ends of the screw and bushing being rounded. The pin which is formed upon the screw 19 extends through an orifice in the upper end of the link 12, which is so shaped as to provide for universal movement of the parts. The connection between the lower ends of the links and the arms 17 and 18 is similar to that between the upper ends of the links and the arms 10 and 11, the lower end of each link being mounted upon a pin which is formed on a screw 21 and enters a depression in the bushing 22, the adjacent ends of the screw 21 and bushing 22 being rounded to allow universal movement of the end of the link therebetween.

In the operation of the device if a load to be weighed were placed upon the forward portion of the platter, any tendency of the platter to tilt forwardly would create a downward thrust upon the link 12 which would rock the member 16 to create a downward pull upon the link 13. The downward pull upon the link 13 would obviously tend to tilt the platform rearwardly, and the tendency to tilt forwardly would thus be overcome. The operation of the device is obviously unaffected by settling of the platform spider due to wearing of the fulcrum pivots 4 or the load pivots 7.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a frame, a lever fulcrumed thereon, said lever having aligned load pivots, a commodity-receiver supported upon said pivots, a member pivoted to said frame on a horizontal axis in non-parallel relation to the pivotal axis of the lever fulcrum, and a plurality of links pivotally connecting said commodity-receiver and said member.

2. In a weighing scale, in combination, a frame, a lever fulcrumed thereon, said lever having aligned load pivots, a commodity-receiver supported upon said pivots, a depending link connected to said commodity-receiver forwardly of said load pivots, a depending link connected to said commodity-receiver rearwardly of said load pivots, and means connected to the lower ends of said links to prevent relative up and down movement thereof while permitting said links to move up and down together.

3. In a weighing scale, in combination, a frame, a lever provided with aligned load pivots, a commodity-receiver supported by said pivots, a pair of links pivoted to said commodity-receiver at points spaced transversely of the axis of said load pivots, and means preventing relative movement of said links while permitting concurrent up and down movement thereof.

4. In a weighing scale, in combination, a frame, a lever fulcrumed thereon, a commodity-receiver pivotally supported upon said lever, a member rockably supported upon said frame, the axis of movement of said member being at right angles to the axis of movement of said lever, and a pair of links connecting said commodity-receiver and said member.

5. In a weighing scale, in combination, a frame, a lever fulcrumed thereon, a commodity-receiver support upon said lever, a pair of oppositely-extending arms on said commodity-receiver support, a rocking member on said frame, a pair of arms on said rocking member, and links connecting the arms on said support and the arms on said rocking member.

6. In a weighing scale, in combination, a frame, a lever fulcrumed thereon, load pivots on said lever, the axis of said load pivots being parallel to the axis of movement of said lever, a commodity-receiver support on said load pivots, a pair of links pivoted to said commodity-receiver support, a member pivoted to said frame on an axis at right angles to the axis of said load pivots, and arms on said member extending beneath said commodity-receiver support and pivotally connected to said links.

7. In a weighing scale, in combination, a frame, a lever fulcrumed thereon, aligned load pivots on said lever, a platter spider on said load pivots, a forwardly and a rearwardly extending arm on said spider, a rocking member pivoted to said frame on an axis parallel to the plane of movement of said lever, laterally-extending arms on said member, and downwardly-extending links connecting the arms on said spider to the arms on said rocking member.

HALVOR O. HEM.

Witnesses:
C. O. MARSHALL,
M. C. OHL.